United States Patent
Zhang

(10) Patent No.: US 9,083,181 B2
(45) Date of Patent: Jul. 14, 2015

(54) OVER-CURRENT PROTECTION CIRCUIT FOR LIGHT SOURCE DRIVING MODULE AND RELATED BACKLIGHT MODULE

(71) Applicant: Shenzhen China Star Optoelectronics Technology Co., Ltd., Shenzhen, Guangdong (CN)

(72) Inventor: Xianming Zhang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 186 days.

(21) Appl. No.: 13/879,623

(22) PCT Filed: Apr. 15, 2013

(86) PCT No.: PCT/CN2013/074205
§ 371 (c)(1),
(2) Date: Apr. 16, 2013

(87) PCT Pub. No.: WO2014/166125
PCT Pub. Date: Oct. 16, 2014

(65) Prior Publication Data
US 2014/0307351 A1    Oct. 16, 2014

(51) Int. Cl.
*H05B 1/02* (2006.01)
*H02H 7/20* (2006.01)
*G09G 3/00* (2006.01)
*H02H 3/08* (2006.01)

(52) U.S. Cl.
CPC . *H02H 7/20* (2013.01); *G09G 3/00* (2013.01); *H02H 3/08* (2013.01)

(58) Field of Classification Search
USPC .......................................................... 361/93.7
See application file for complete search history.

(56) References Cited

U.S. PATENT DOCUMENTS

| | | | |
|---|---|---|---|
| 7,990,078 B2 * | 8/2011 | Petrucci et al. | 315/309 |
| 8,742,695 B2 * | 6/2014 | Wray | 315/307 |
| 8,836,242 B2 * | 9/2014 | Zhang et al. | 315/307 |
| 2006/0261752 A1 * | 11/2006 | Lee | 315/291 |
| 2008/0315780 A1 * | 12/2008 | Lee et al. | 315/210 |
| 2010/0109537 A1 * | 5/2010 | Nishino et al. | 315/185 R |
| 2010/0156324 A1 * | 6/2010 | Nagase et al. | 315/307 |
| 2013/0015781 A1 * | 1/2013 | Kanemitsu et al. | 315/291 |
| 2013/0181635 A1 * | 7/2013 | Ling | 315/297 |
| 2013/0293109 A1 * | 11/2013 | Cheon et al. | 315/122 |
| 2014/0176014 A1 * | 6/2014 | Hu et al. | 315/307 |
| 2014/0312768 A1 * | 10/2014 | Wu et al. | 315/85 |
| 2015/0042925 A1 * | 2/2015 | Hu et al. | 349/69 |

* cited by examiner

*Primary Examiner* — Thienvu Tran
*Assistant Examiner* — Angela Brooks
(74) *Attorney, Agent, or Firm* — Andrew C. Cheng

(57) ABSTRACT

The present invention discloses an overcurrent protection circuit for a light source driving module and a related backlight module. The overcurrent protection circuit includes an average value overcurrent protection circuit for detecting an average voltage at a node where the switch is connected to the detection resistor and generating the turning-off signal to turn off the switch when the average voltage is larger or equal to a threshold average voltage, wherein the average voltage is formed by an average current of the switch. Through the above-mentioned mechanism, the present invention can prevent the working power of a power device from being larger than its rated power. Therefore, it also prevents the power device from catching a fire due to a potential high temperature.

6 Claims, 2 Drawing Sheets

OVER-CURRENT PROTECTION CIRCUIT FOR LIGHT SOURCE DRIVING MODULE AND RELATED BACKLIGHT MODULE

BACKGROUND OF THE INVENTION

1. Field of the Invention

The invention relates to a display technique, and more particularly, to an overcurrent protection circuit for a light source driving module and related backlight module.

2. Description of the Prior Art

In order to raise efficiencies in a LED backlight module, a high frequency switching mode converter is often used. Moreover, an overcurrent protection is often adopted in order to raise the stability. Conventionally, the overcurrent protection is realized by detecting whether a maximum current value exceeds a predetermined threshold, and if it exceeds the threshold, the high frequency switching mode converter generates a turning-off signal to perform the overcurrent protection. In this way, it prevents the power device of the LED backlight module from being working in a huge-current condition.

However, the above-mentioned overcurrent protection mechanism introduces some problems. For example, the threshold corresponds to a maximum current value. It means it is higher than a normal current value. Therefore, as long as the current value does not exceed the maximum value, the power device inside the LED backlight module continues to work. Unfortunately, when the current value is a little bit larger but not larger than the maximum current value, it may make the power of the power device larger than a rated power. This may cause the temperature of the power device higher than a normal temperature such that, the power device may be damaged or catch a fire.

SUMMARY OF THE INVENTION

It is therefore one of the primary objectives of the claimed invention to provide an overcurrent protection circuit and a related backlight module to prevent the working power of the power device from being larger than its rated power, and to further prevent the power device from catching a fire due to a high temperature.

According to an exemplary embodiment of the claimed invention, an overcurrent protection circuit for a light source driving module is disclosed. The light source driving module comprises a power module. The power module comprises a switch and a detection resistor, where a first end of the switch is electrically connected to a first end of the detection resistor, a second end of the detection resistor is electrically connected to ground. The overcurrent protection circuit comprises: a peak value overcurrent protection module, for detecting a voltage at a node where the switch is connected to the detection resistor and generating a turning-off signal to turn off the switch when the voltage is larger or equal to a threshold voltage, wherein the voltage is thrilled by a current of the switch; and an average value overcurrent protection module, forming a logic AND with the peak value overcurrent protection module, for detecting an average voltage at the node and generating the turning-off signal to turn off the switch when the average voltage is larger or equal to a threshold average voltage, wherein the average voltage is formed by an average current of the switch, and the average voltage is an average value of the voltage within one or more switching periods.

In one aspect of the present invention, the average value overcurrent protection module comprises: an average value calculating unit, for detecting the average voltage at the node; and an average value comparing unit, for comparing the average voltage with the threshold average voltage. If the average voltage is larger or equal to the threshold average voltage, the turning-off signal is generated to turn off the switch.

In another aspect of the present invention, the average value calculating unit is an integrator.

According to another exemplary embodiment of the claimed invention, a backlight module is disclosed. The backlight module comprises: a light source; a light source driving module, for driving the light source. The light source driving module comprises: a power module and an overcurrent protection circuit. The power module comprises a switch; a detection resistor, wherein a first end of the switch is electrically connected to a first end of the detection resistor, a second end of the detection resistor is electrically connected to ground; and a driving chip, for providing a driving signal and receiving a current flowing through the switch. The overcurrent protection circuit receives the driving signal. The overcurrent protection circuit comprises: a peak value overcurrent protection module, for detecting a voltage at a node where the switch is connected to detection resistor and generating a turning-off signal to turn off the switch when the voltage is larger or equal to a threshold voltage, wherein the voltage is formed by a current of the switch; and an average value overcurrent protection module, forming a logic AND with the peak value overcurrent protection module. The average value overcurrent protection module comprises: an average value calculating unit, for detecting the average voltage at the node; and an average value comparing unit, for comparing the average voltage with the threshold average voltage; wherein if the average voltage is larger or equal to the threshold average voltage, the average value overcurrent protection circuit generates the turning-off signal to turn off the switch. The average voltage is an average value of the voltage within one or more switching periods.

In one aspect of the present invention, the peak value overcurrent protection module and the average value protection module are both installed inside the driving chip. The overcurrent protection circuit further comprises a logic AND arithmetic unit receiving the driving signal and signals generated by the average value overcurrent protection module and peak value overcurrent protection module. If one of the driving signal and the signals generated by the average value overcurrent protection module and the peak value overcurrent protection module corresponds to the turning-off signal, the logic AND arithmetic unit generate the turning-off signal to a control end of the switch to turn off the switch.

In another aspect or the present invention, the switch is an N-type MOSFET, and the control end of the switch is a gate of the N-type MOSFET.

In another aspect of the present invention, the peak value overcurrent protection module is installed inside the driving chip. The average value overcurrent protection module is installed outside the driving chip. The overcurrent protection circuit further comprises a first logic AND arithmetic unit. The peak value overcurrent protection module comprises a peak value comparing unit and a second logic AND arithmetic unit. The peak value comparing, unit compares the voltage with the threshold voltage. If the voltage is larger than or equal to the threshold voltage, a turning-off signal is generated by the peak value comparing unit. The second logic AND arithmetic unit receives the driving signal and a signal generated by the peak value comparing unit. If the driving signal or the signal generated by the peak value comparing unit corresponds to the turning-off signal, then the turning-off signal is generated by the second logic AND arithmetic unit. The first logic AND arithmetic unit receives signals generated by the average value overcurrent protection module and the peak value overcurrent protection module. If one of the signals generated by the average value overcurrent protection module and the peak value overcurrent protection module corresponds to the turning-off signal, then the first logic AND arithmetic unit generates the turning-off signal to a control end of the switch to turn off the switch.

In still another aspect of the present invention, the switch is an N-type MOSFET, and the control end of the switch is a gate of the N-type MOSFET.

In yet another aspect of the present invention, the average value calculating unit is an integrator.

According to another exemplary embodiment of the claimed invention, a backlight module comprises a light source, and a light source driving module for driving the light source. The light source driving module comprises a power module and an overcurrent protection circuit. The power module comprises a switch and a detection resistor. A first end of the switch is electrically connected to a first end of the detection resistor. A second end of the detection resistor is electrically connected to ground. The overcurrent protection circuit comprises a peak value overcurrent protection module and an average value overcurrent protection module. The peak value overcurrent protection module is used for detecting a voltage at a node where the switch and the detection resistor are connected and generating, a turning-off signal to turn off the switch when the voltage is larger or equal to a threshold voltage. The voltage is formed by a current of the switch. The average value overcurrent protection module is used for forming a logic AND with the peak value overcurrent protection module, for detecting an average voltage at the node and generating the turning-off signal to turn off the switch when the average voltage is larger or equal to a threshold average voltage. The average voltage is formed by an average current of the switch, and the average voltage is an average value of the voltage within one or more switching periods.

In one aspect of the present invention, the average value overcurrent protection module comprises an average value calculating unit, for detecting the average voltage at the node; and an average value comparing unit, for comparing the average voltage with the threshold average voltage. If the average voltage is larger or equal to the threshold average voltage, the turning-off signal is generated to turn off the switch.

In another aspect of the present invention, the backlight module further comprises a driving chip for providing a driving signal and receiving a current flowing through the switch.

In another aspect of the present invention, the peak value overcurrent protection module and the average value protection module are both installed inside the driving chip. The overcurrent protection circuit further comprises a logic AND arithmetic unit receiving the driving signal and signals generated by the average value overcurrent protection module and peak value overcurrent protection module. If one of the driving signal and the signals generated by the average value overcurrent protection module and the peak value overcurrent protection module corresponds to the turning-off signal, the logic AND arithmetic unit generate the turning-off signal to a control end of the switch to turn off the switch.

In another aspect of the present invention, the switch is an N-type MOSFET, and the control end of the switch is a gate of the N-type MOSFET.

In another aspect of the present invention, the peak value overcurrent protection module is installed inside the driving chip. The average value overcurrent protection module is installed outside the driving chip. The overcurrent protection circuit further comprises a first logic AND arithmetic unit. The peak value overcurrent protection module comprises a peak value comparing unit and a second logic AND arithmetic unit. The peak value comparing unit compares the voltage with the threshold voltage. If the voltage is larger than or equal to the threshold voltage, a turning-off signal is generated by the peak value comparing unit. The second logic AND arithmetic unit receives the driving signal and a signal generated by the peak value comparing unit. If the driving signal or the signal generated by the peak value comparing unit corresponds to the turning-off signal, then the turning-off signal is generated by the second logic AND arithmetic unit. The first logic AND arithmetic unit receives signals generated by the average value overcurrent protection module and the peak value overcurrent protection module. If one of the signals generated by the average value overcurrent protection module and the peak value overcurrent protection module corresponds to the turning-off signal, then the first logic AND arithmetic unit generates the turning-off signal to a control end of the switch to turn off the switch.

In still another aspect of the present invention, the switch is an N-type MOSFET, and the control end of the switch is a gate of the N-type MOSFET.

In yet another aspect of the present invention, the average value calculating unit is an integrator.

The present invention overcurrent protection circuit includes a peak value overcurrent protection circuit and an average value overcurrent protection circuit. The peak value overcurrent protection circuit detects a voltage at a node where the switch is connected to the detection resistor and generating a turning-off signal to turn off the switch when the voltage is larger or equal to a threshold voltage, wherein the voltage is formed by a current of the switch. The average value overcurrent protection module detects an average voltage at the node and generating the turning-off signal to turn off the switch when the average voltage is larger or equal to a threshold average voltage, wherein the average voltage is formed by an average current of the switch, and the average voltage is an average value of the voltage during one or more periods. The average value overcurrent protection circuit and the peak value overcurrent protection circuit form a logic AND relationship. Therefore, if one of the average value overcurrent protection circuit and the peak value overcurrent protection circuit generate the turning-off signal, the switch is turned off. In this way, the working power of the power device is protected without being larger than a rated power such that the power device is prevented from catching a fire due to a potential high temperature.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
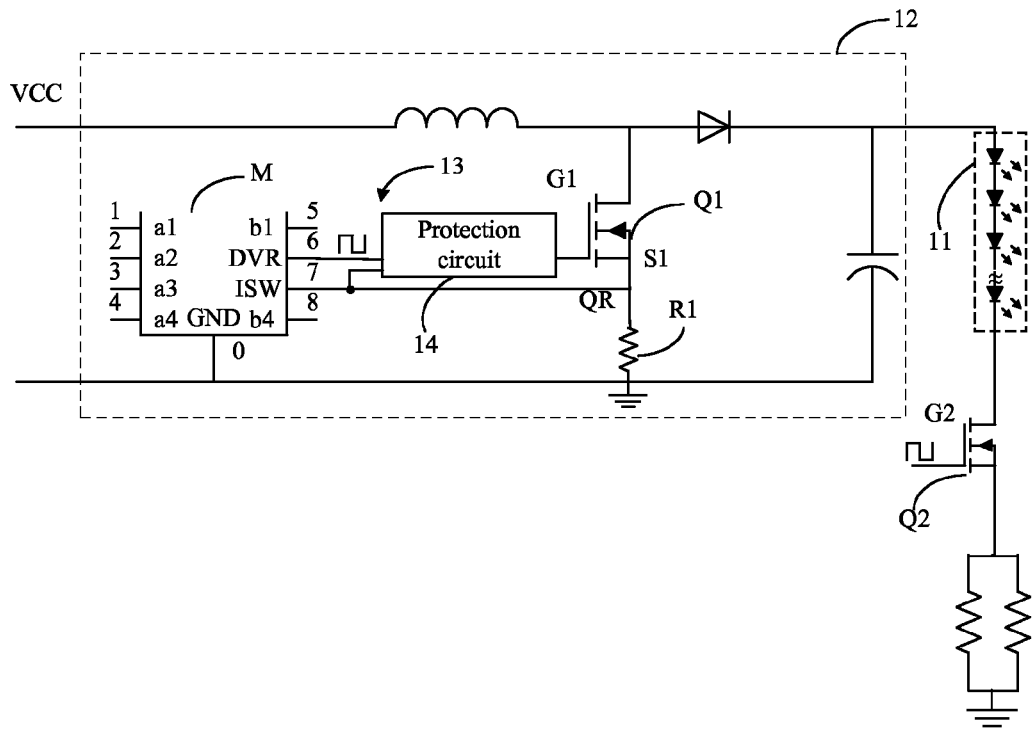
FIG. 1 is a diagram showing a circuit of a backlight module according a first embodiment of the present invention.

Please refer to FIG. 1, which is a diagram showing a circuit of a backlight module according to a first embodiment of the present invention. As shown in FIG. 1, the backlight module 10 comprises a light source 11 and a light source driving module 12 for driving the light source 11. The light source driving module 12 comprises a power module 13 and an overcurrent protection circuit 14. The power module 13 comprises a switch Q1 and a detection resistor R1, where the first end S1 of the switch Q1 is electrically connected to the first end of the detection resistor R1, and the second end of the detection resistor R1 is electrically connected to ground.

Figure 2:
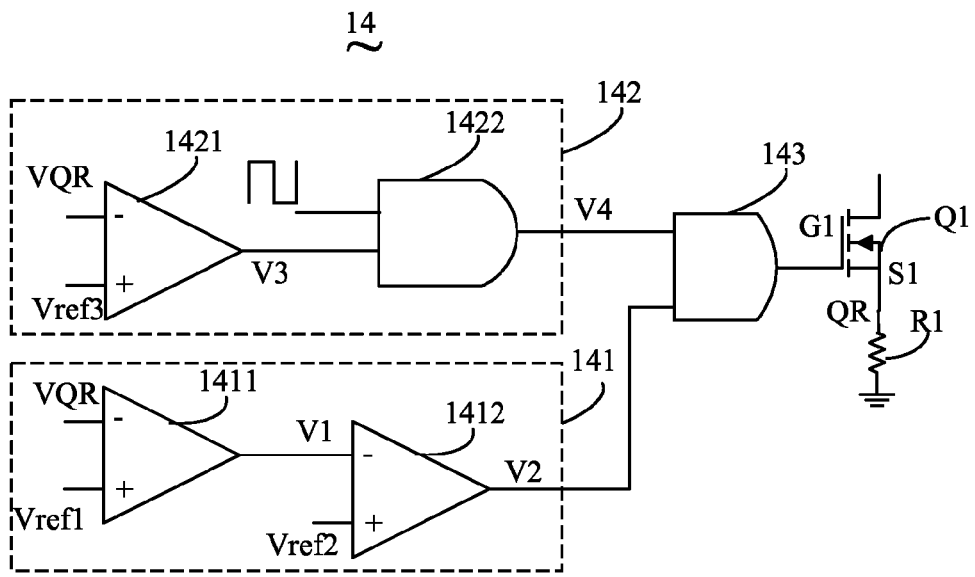
FIG. 2 is a diagram showing an overcurrent protection circuit according to an embodiment of the present invention.

In this embodiment, the overcurrent protection circuit 14 is used for preventing the current of the backlight module from being too huge. Please refer to FIG. 2 in conjunction with FIG. 1. FIG. 2 is a diagram showing the overcurrent protection circuit 14 according to an embodiment of the present invention. As shown in FIG. 2, the overcurrent protection circuit 14 comprises an average value overcurrent protection module 141 and a peak value overcurrent protection module 142. The peak value overcurrent protection module 142 is used to detect a voltage at the node QR where the switch Q1 connected to the detection resistor R1, where the voltage is caused by a current of the switch Q1, if the voltage is larger than or equal to a predetermined threshold voltage, the peak value overcurrent protection module 142 generates a turning-off signal to turn off the switch Q1. The average value overcurrent protection module 141 and the peak value overcurrent protection module 142 form a logic AND relationship, for detecting an average voltage at the node QR, where the average voltage is caused by an average current of the switch Q1. If the average voltage is larger than or equal to a predetermined threshold average voltage, the average value overcurrent protection module 141 generates the turning-off signal to turn off the switch Q1. The average voltage is an average value of the voltage at the node within one or more switching periods.

Specifically, the backlight module further comprises a switch Q2. The power module 13 further comprises a driving chip M. The switch Q2 is used to control the working state of the light source 11. The sixth pin DVR of the driving chip M is connected to the control end 62 of the switch Q2 and the overcurrent protection circuit 14 (not shown), and is used to provide a driving signal to the control end G2 of the switch Q2 and the overcurrent protection circuit 14. The seventh pin ISW of the driving chip M is connected to the node QR to receive the current of the switch Q1 (the current flowing through the switch Q1). The overcurrent protection circuit 14 further receives the voltage at the node QR formed by the current of the switch Q1. Specifically, the peak value overcurrent protection module 142 is installed inside the driving chip M, and the average value overcurrent protection module 141 is installed outside the driving chip M. The overcurrent protection circuit 14 further comprises a first logic AND arithmetic unit 143. The average value overcurrent protection module 141 comprises an average value calculating unit 1411 and an average value comparing unit 1412. The peak value overcurrent protection module 142 comprises a peak value comparing unit 1421 and a second logic AND arithmetic unit 1422.

In this embodiment, the average value calculating unit 1411 is used to detect an average voltage at the node QR where the switch Q1 and the detection resistor R1 are connected. The average value comparing unit 1412 is used to compare the average voltage with a predetermined average voltage. If the average voltage is larger than or equal to a threshold average voltage, the turning-off signal is generated to turn off the switch Q1. The peak value comparing unit 1421 compares the voltage with the predetermined threshold voltage. If the voltage is larger than or equal to the predetermined threshold voltage, the turning-off signal is generated. The second logic AND arithmetic unit 1422 receives the driving signal and the signal generated by the peak value comparing unit 1421. If the driving signal or the signal generated by the peak value comparing unit 1421 corresponds to the turning-off signal, then the turning-off signal is outputted by the second logic AND arithmetic unit 1422.

Specifically, the negative input end of the average value calculating unit 1411 is electrically connected to the node QR to receive the voltage VQR of the node QR caused by the current of the switch Q1. The positive input end of the average value calculating unit 1411 receives a predetermined DC voltage Vref1. The output end of the average value calculating unit 1411 outputs a calculating result V1 to the negative input end of the average value comparing unit 1412. The positive input end of the average value comparing unit 1412 receives a predetermined average voltage Vref2. The output end of the average comparing unit 1412 outputs a voltage signal V2 to the first logic AND arithmetic unit 143. The negative input end of the peak value comparing unit 1421 is electrically connected to the node QR to receive the voltage VQR of the node QR caused by the current of the switch Q1. The positive input of the peak value comparing unit 1421 receives the predetermined peak voltage Vref3. The output end of the peak value comparing unit 1421 outputs a voltage signal V3 to a first input end of the second logic AND arithmetic unit 1422. The second input end of the second logic AND arithmetic unit 1422 receives the driving signal. The output end of the second logic AND arithmetic unit 1422 outputs a voltage signal V4 to the second input end of the first logic AND arithmetic unit 143. The output end of the first logic AND arithmetic unit 1422 is electrically connected to the control end G1 of the switch.

Figure 3:
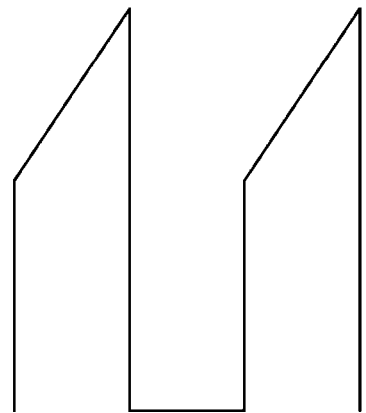
FIG. 3 is a diagram showing a waveform of voltage at a node where a switch and a detection resistor is connected.

In this embodiment, the waveform of the voltage VQR is shown in FIG. 3. The voltage VQR varies as time goes by. The switch Q1 is an N-type MOSFET. The first end S1 is the source of the N-type MOSFET, and the control end G1 is the gate of the N-type MOSFET. The average calculating unit 1411 is an integrator. The average comparing unit 1412 is a comparator. The average calculating unit 1411 is mainly used to detect the average value of the voltage VQR. When the sum of difference of of the voltage VQR and the DC voltage Vref1 within one or more switching periods is 0, the calculating result V1 outputted by the average value calculating unit 1411 is 0. When the voltage VQR increases and the sum of difference of the voltage VQR and the DC voltage Vref1 within one or more switching periods is not 0, the calculating result V1 outputted by the average value calculating unit 1411 is larger than 0 and increases. When the voltage signal V1 is larger than the predetermined threshold average voltage Vref2, the voltage signal V2 outputted by the average comparing unit 1412 corresponds to a low voltage level. The first logic AND arithmetic unit 142 outputs a low voltage level. Because the switch Q1 is an N-type MOSFET, when the first logic AND arithmetic unit 142 outputs a low voltage level, the switch Q1 is turned off.

Similarly, the peak value comparing unit 1421 is a comparator, and is used for comparing, the voltage VQR with the predetermined peak value Vref3. If the voltage VQR is larger than or equal to the predetermined peak value Vref3, the voltage signal V3 outputted by the peak value comparing unit 1421 corresponds to a low level such that the first logic AND arithmetic unit 143 outputs a low voltage level to turn of the switch Q1. If the voltage VQR is lower than the predetermined peak value Vref3, the voltage signal V3 outputted by the peak value comparing unit 1421 corresponds to a high level. At this time the output of the second logic AND arithmetic unit 1422 is determined by the driving signal. When the driving signal corresponds to a high level, the second logic AND arithmetic unit 1422 outputs a high voltage level. On the other hand, when the driving signal corresponds to a low level, the second logic AND arithmetic unit 1422 outputs a low voltage level.

In this embodiment, when the backlight module 10 encounters an overcurrent, the first logic AND arithmetic unit 144 of the overcurrent protection circuit 14 turns off the switch Q1 such that no current is inputted into the seventh pin ISW of the driving chip M. The driving chip M stop working such that the sixth pin DVR of the driving chip M outputs no driving signal and thus turns off the switch Q2. At this time, the light source 11 does not work. Therefore, the power devices such like the driving chip M and the light source 11 are both protected.

In this embodiment, the predetermined DC voltage Vref1 is a DC bias, which is related to a DC component of the voltage VQR. If the DC component of the voltage VQR is larger, it means the predetermined DC voltage Vref1 is also larger such that the output V1 of the average value calculating unit 1411 is 0 within one or more switching periods. The predetermined average voltage Vref2 is a protection threshold of the average voltage of the voltage VQR because the power consumption of each power device of the backlight module 10 is proportional to the square of the effective value of the current. And the effective value of the current can be obtained from the ratio of the effective value of the voltage and the resistance. Therefore, through using the predetermined average voltage Vref2 as the protection threshold, the present invention can control the power consumption of each power device of the backlight module 10.

In a preferred embodiment, the switch Q1 can be implemented with a P-type MOSFET. And a logic NOT arithmetic unit is connected to the output of the first logic AND arithmetic unit.

In another preferred embodiment, the inputs signals of the negative input and the positive input of the peak value comparing unit 1421 and the average value comparing unit 1412 can be switched. And the first logic AND arithmetic unit 143 and the second logic AND arithmetic unit 1422 should be correspondingly adjusted to ensure the overcurrent protection circuit 14 can output the turning-off signal to turn off the switch Q1 when the peak value of the voltage VQR is larger than or equal to the predetermined threshold voltage, or the average voltage VQR is larger than or equal to the predetermined threshold average voltage, or the driving signal is the turning-off signal.

Figure 4:
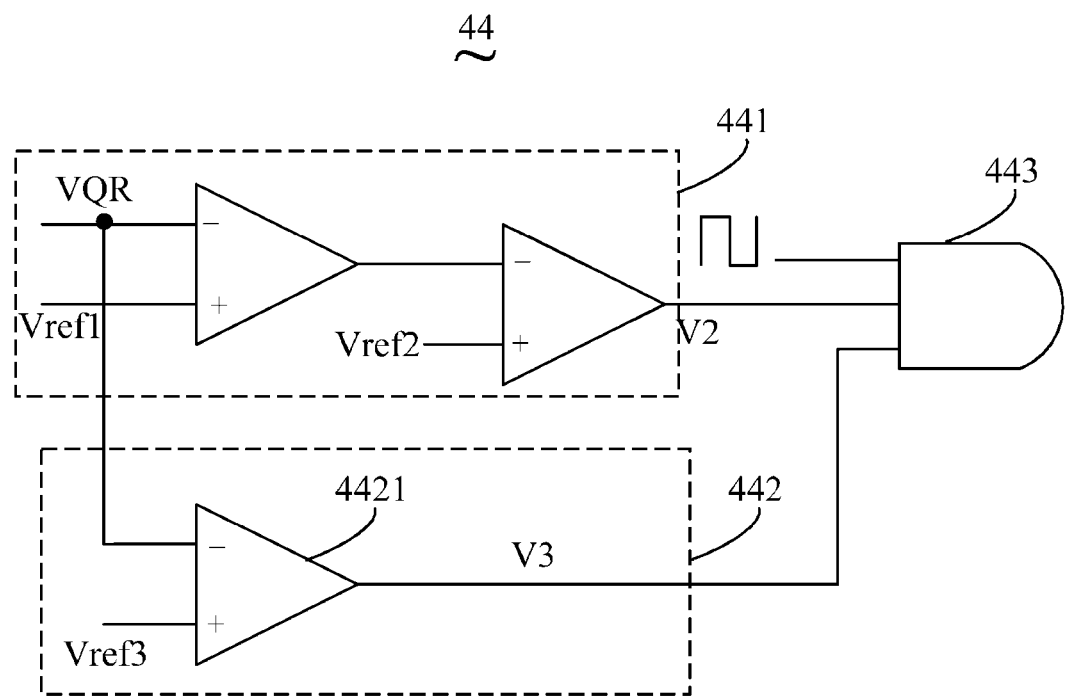
FIG. 4 is a diagram showing an overcurrent protection circuit according to another embodiment of the present invention.

In another preferred embodiment, the peak value overcurrent protection module and the average value overcurrent protection module can be both installed inside the driving chip. As shown in FIG. 4, the overcurrent protection circuit 44 still comprises the peak value overcurrent protection module 442, the average value overcurrent protection module 441, and a logic AND arithmetic unit 443. The difference between the overcurrent protection circuit 44 and the above-mentioned overcurrent protection circuit 14 is: The peak value overcurrent protection module 442 only comprises the peak value comparing unit 4421. The logic AND arithmetic unit 443 receives the driving signal, the voltage signal V2 outputted by the average value overcurrent protection module 441, and the voltage signal V3 of the peak value overcurrent protection module 442. When one of the driving signal the voltage signal V2 and the voltage signal V3 corresponds to a low voltage level, the AND logic arithmetic unit 443 outputs a low voltage level to the switch Q1 to turn off the switch.

Please note, the working mechanisms of the average value overcurrent module 441 and the peak value overcurrent module 442 are similar to those device having the same names in FIG. 2, and thus omitted here.

In addition, the type of the switch Q1 and the connection configuration with the overcurrent protection circuit 44 can be adjusted according to the above-mentioned disclosure, and thus omitted here.

In contrast to the prior art, the present invention overcurrent protection circuit utilizes the peak value overcurrent protection module to detect the voltage at the node where the switch and the detection resistor are connected, and turn off the switch if the voltage is larger than or equal to a threshold voltage. Furthermore, the present invention utilizes the average value overcurrent protection module to detect the average voltage at the node where the switch and the detection resistor are connected, and turn off the switch if the average voltage is larger than or equal to a threshold average voltage, wherein the average voltage is the average of the voltage within one or more switching periods. In addition, the peak value overcurrent protection module and the average value overcurrent protection module form a logic AND. Therefore, if one of them generates a turning off signal, the switched is turned off. In this way, the present invention can prevent the working power of power device from exceeding the rated power and thus prevent the power device from catching a fire due to its potential high temperature.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An overcurrent protection circuit for a light source driving module, the light source driving module comprising a power module, the power module comprising a switch and a detection resistor, a first end of the switch electrically connected to a first end of the detection resistor, a second end of the detection resistor electrically connected to ground, the overcurrent protection circuit comprising:

a peak value overcurrent protection module, for detecting a voltage at a node where the switch and the detection resistor are connected and generating a turning-off signal to turn off the switch when the voltage is larger or equal to a threshold voltage, wherein the voltage is formed by a current of the switch; and an average value overcurrent protection module, performing a logic AND operation with the peak value overcurrent protection module, for detecting an average voltage at the node and generating the turning-off signal to turn off the switch when the average voltage is larger or equal to a threshold average voltage, wherein the average voltage is formed by an average current of the switch, and the average voltage is an average value of the voltage within one or more switching periods;

wherein the overcurrent protection circuit further comprises a first logic AND arithmetic unit, and the peak value overcurrent protection module comprises a peak value comparing unit and a second logic AND arithmetic unit; wherein the peak value comparing unit compares the voltage with the threshold voltage; wherein if the voltage is larger than or equal to the threshold voltage, the turning-off signal is generated by the peak value comparing unit; wherein the second logic AND arithmetic unit receives a driving signal and a signal generated by the peak value comparing unit; wherein if the driving signal or the signal generated by the peak value comparing unit corresponds to the turning-off signal, then the turning-off signal is generated by the second logic AND arithmetic unit; wherein the first logic AND arithmetic unit receives signals generated by the average value overcurrent protection module and the peak value overcurrent protection module; if one of the signals generated by the average value overcurrent protection module and the peak value overcurrent protection module corresponds to the turning-off signal, then the first logic AND arithmetic unit generates the turning-off signal to a control end of the switch to turn off the switch.

2. A backlight module comprising:
a light source; and
a light source driving module, for driving the light source, the light source driving module comprising:
a power module, comprising:
a switch;
a detection resistor, wherein a first end of the switch is electrically connected to a first end of the detection resistor, a second end of the detection resistor is electrically connected to ground; and
a driving chip, for providing a driving signal and receiving a current flowing through the switch; and
an overcurrent protection circuit, for receiving the driving signal, the overcurrent protection circuit comprising:
a peak value overcurrent protection module, for detecting a voltage at a node where the switch is connected to the detection resistor and generating a turning-off signal to turn off the switch when the voltage is larger or equal to a threshold voltage, wherein the voltage is formed by a current of the switch; and
an average value overcurrent protection module, performing a logic AND operation with the peak value overcurrent protection module, the average value overcurrent protection module comprising:
an average value calculating unit, for detecting an average voltage at the node; and
an average value comparing unit, for comparing the average voltage with a threshold average voltage;
wherein if the average voltage is larger or equal to the threshold average voltage, the average value overcurrent protection circuit module generates the turning-off signal to turn off the switch;
wherein the average voltage is an average value of the voltage within one or more switching periods;
wherein the peak value overcurrent protection module is installed inside the driving chip, the average value overcurrent protection module is installed outside the driving chip, the overcurrent protection circuit further comprises a first logic AND arithmetic unit, and the peak value overcurrent protection module comprises a peak value comparing unit and a second logic AND arithmetic unit; wherein the peak value comparing unit compares the voltage with the threshold voltage; wherein if the voltage is larger than or equal to the threshold voltage, the turning-off signal is generated by the peak value comparing unit; wherein the second logic AND arithmetic unit receives the driving signal and a signal generated by the peak value comparing unit; wherein if the driving signal or the signal generated by the peak value comparing unit corresponds to the turning off signal, then the turning-off signal is generated by the second logic AND arithmetic unit; wherein the first logic AND arithmetic unit receives signals generated by the average value overcurrent protection module and the peak value overcurrent protection module; if one of the signals generated by the average value overcurrent protection module and the peak value overcurrent protection module corresponds to the turning-off signal, then the first logic AND arithmetic unit generates the turning-off signal to a control end of the switch to turn off the switch.

3. The backlight module of claim 2, wherein the switch is an N-type MOSFET, and the control end of the switch is a gate of the N-type MOSFET.

4. The backlight module of claim 2, wherein the average value calculating unit is an integrator.

5. A backlight module, comprising:
a light source;
a light source driving module, for driving the light source, the light source driving module comprising:
a power module, comprising a switch and a detection resistor, a first end of the switch electrically connected to a first end of the detection resistor, a second end of the detection resistor electrically connected to ground; and
an overcurrent protection circuit comprising:
a peak value overcurrent protection module, for detecting a voltage at a node where the switch and the detection resistor are connected and generating a turning-off signal to turn off the switch when the voltage is larger or equal to a threshold voltage, wherein the voltage is formed by a current of the switch; and
an average value overcurrent protection module, performing a logic AND operation with the peak value overcurrent protection module, for detecting an average voltage at the node and generating the turning-off signal to turn off the switch when the average voltage is larger or equal to a threshold average voltage, wherein the average voltage is formed by an average current of the switch, and the average voltage is an average value of the voltage within one or more switching periods, and
a driving chip for providing a driving signal and receiving a current flowing through the switch;
wherein the peak value overcurrent protection module is installed inside the driving chip, the average value overcurrent protection module is installed outside the driving chip, the overcurrent protection circuit further comprises a first logic AND arithmetic unit, and the peak value overcurrent protection module comprises a peak value comparing unit and a second logic AND arithmetic unit; wherein the peak value comparing unit compares the voltage with the threshold voltage; wherein if the voltage is larger than or equal to the threshold voltage, the turning-off signal is generated by the peak value comparing unit; wherein the second logic AND arithmetic unit receives the driving signal and a signal generated by the peak value comparing unit; wherein if the driving signal or the signal generated by the peak value comparing unit corresponds to the turning-off signal, then the turning-off signal is generated by the second logic AND arithmetic unit; wherein the first logic AND arithmetic unit receives signals generated by the average value overcurrent protection module and the peak value overcurrent protection module; if one of the signals generated by the average value overcurrent protection module and the peak value overcurrent protection module corresponds to the turning-off signal, then the first logic AND arithmetic unit generates the turning-off signal to a control end of the switch to turn off the switch.

6. The backlight module of claim 5, wherein the switch is an N-type MOSFET, and the control end of the switch is a gate of the N-type MOSFET.

* * * * *